(12) United States Patent  (10) Patent No.: US 7,543,503 B2
Eguchi et al.  (45) Date of Patent: Jun. 9, 2009

(54) DEFORMATION DETECTION SENSOR WITH TEMPERATURE CORRECTION

(75) Inventors: Yoshimasa Eguchi, Utsunomiya (JP); Takahiro Kamei, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/867,810

(22) Filed: Oct. 5, 2007

(65) Prior Publication Data

US 2008/0083285 A1  Apr. 10, 2008

(30) Foreign Application Priority Data

Oct. 10, 2006  (JP) ............... 2006-276317

(51) Int. Cl.
*G01B 7/16* (2006.01)
(52) U.S. Cl. ...................................... 73/777
(58) Field of Classification Search ............ 73/777
See application file for complete search history.

(56) References Cited

U.S. PATENT DOCUMENTS

| | | | |
|---|---|---|---|
| 5,220,836 A * | 6/1993 | Harms et al. ................. 73/702 |
| 5,447,051 A * | 9/1995 | Hanks et al. ................. 73/1.15 |
| 6,204,756 B1 | 3/2001 | Senyk et al. | |
| 7,304,566 B2 * | 12/2007 | Mae et al. .................... 340/436 |
| 2005/0104721 A1 * | 5/2005 | Mae et al. .................... 340/436 |
| 2006/0131900 A1 | 6/2006 | Lu et al. | |
| 2007/0176615 A1 * | 8/2007 | Sinsheimer ................. 324/757 |

FOREIGN PATENT DOCUMENTS

JP  2006-112858  4/2006

* cited by examiner

*Primary Examiner*—Max Noori
(74) *Attorney, Agent, or Firm*—Rankin, Hill & Clark LLP

(57) ABSTRACT

A deformation detection sensor including: a piezoelectric element which generates an output signal due to a deformation; a reference signal input device which inputs a reference signal of a predetermined cycle to the piezoelectric element; a first signal extraction device which extracts a first output signal due to the deformation of the piezoelectric element out of an output signal from the piezoelectric element; a second signal extraction device which extracts a second output signal due to the reference signal out of the output signal from the piezoelectric element; a first evaluation device which evaluates the first output signal extracted by the first signal extraction device; and a second evaluation device which evaluates the second output signal extracted by the second signal extraction device.

5 Claims, 4 Drawing Sheets

DEFORMATION DETECTION SENSOR WITH TEMPERATURE CORRECTION

BACKGROUND OF THE INVENTION

Priority is claimed on Japanese Patent Application No. 2006-276317, filed on Oct. 10, 2006, the content of which is incorporated herein by reference.

FIELD OF THE INVENTION

The present invention relates to a deformation detection sensor.

DESCRIPTION OF THE RELATED ART

Conventionally, a sensor is well known, which is provided with a temperature sensor such as a thermistor for measuring the temperature of a piezoelectric sensor, and corrects the temperature dependency of output characteristics of the piezoelectric sensor in accordance with output of the temperature sensor (see Japanese Unexamined Patent Application, First publication No. 2006-112858, for example).

However, since the above-described conventional sensor needs to have the temperature sensor in addition to the piezoelectric sensor, the sensor has a problem in that it has a complex structure. In addition, it is hard to directly measure the temperature of the piezoelectric sensor with the temperature sensor thereon with high accuracy.

In view of the above-described circumstances, the present invention has an object of providing a deformation detection sensor which can improve detection accuracy and reliability of deformation detection with a piezoelectric sensor.

SUMMARY OF THE INVENTION

In order to achieve the aforementioned object, the present invention employs the followings.

Namely, the present invention employs a deformation detection sensor including: a piezoelectric element which generates an output signal due to a deformation; a reference signal input device which inputs a reference signal of a predetermined cycle to the piezoelectric element; a first signal extraction device which extracts a first output signal due to the deformation of the piezoelectric element out of an output signal from the piezoelectric element; a second signal extraction device which extracts a second output signal due to the reference signal out of the output signal from the piezoelectric element; a first evaluation device which evaluates the first output signal extracted by the first signal extraction device; and a second evaluation device which evaluates the second output signal extracted by the second signal extraction device.

According to the above-described deformation detection sensor, by evaluating the first output signal due to the deformation and the second output signal due to the reference signal respectively, based on the output signal from the piezoelectric element in which the reference signal is input to the piezoelectric element, it is possible to obtain information on the quantity of state, such as temperature, of the piezoelectric element as well as information on the deformation of the piezoelectric element.

It may be arranged such that the deformation detection sensor further includes a correction device which corrects an evaluation result obtained by the first evaluation device based on an evaluation result obtained by the second evaluation device.

In this case, the information on the deformation of the piezoelectric element obtained from the first output signal can be corrected in accordance with the quantity of state, such as temperature, of the piezoelectric element obtained from the second output signal; and thereby improving the detection accuracy and the reliability of the information on the deformation of the piezoelectric element.

It may be arranged such that the second evaluation device evaluates a capacitance or a dielectric constant of the piezoelectric element.

In this case, the information on the deformation of the piezoelectric element obtained from the first output signal can be corrected in accordance with the capacitance or the dielectric constant of the piezoelectric element obtained from the second output signal; and thereby improving the detection accuracy and the reliability of the information on the deformation of the piezoelectric element.

It may be arranged such that the second evaluation device evaluates a temperature of the piezoelectric element.

In this case, the information on the deformation of the piezoelectric element obtained from the first output signal can be corrected in accordance with the temperature of the piezoelectric element obtained from the second output signal; and thereby improving the detection accuracy and the reliability of the information on the deformation of the piezoelectric element.

It may be arranged such that the deformation detection sensor further includes a deformation quantity evaluation device which evaluates a deformation quantity of the piezoelectric element, based on the temperature of the piezoelectric element obtained by the second evaluation device and the deformation of the piezoelectric element obtained by the first evaluation device.

In this case, by evaluating the deformation quantity of the piezoelectric element based on the deformation of the piezoelectric element obtained from the first output signal and the temperature of the piezoelectric element obtained from the second output signal, the detection accuracy and the reliability of the deformation quantity of the piezoelectric element can be improved.

It may be arranged such that the reference signal is higher than the first output signal in frequency; the first signal extraction device includes a low pass filter; the second signal extraction device includes a band pass filter or a detection filter; and a passband used in the first signal extraction device and a passband used in the second signal extraction device are separate to each other.

In this case, the detection accuracy and the reliability of the information on the quantity of state, such as temperature, of the piezoelectric element can be improved based on the first output signal and the second output signal, each having a different frequency range which differs from each other.

BRIEF DESCRIPTION OF THE DRAWINGS

FIG. 5A shows a graph indicating a comparative example of bump sensitivity variation with temperature, while

DETAILED DESCRIPTION OF THE INVENTION

A deformation detection sensor according to an embodiment of the present invention will be described below with reference to the drawings.

A detection sensor 10 according to the present embodiment includes, for example, a sensor body 11 which measures quantity of state on deformation of an outer surface of a vehicle due to a contact or a bump between the outer surface of the vehicle and an object, a reference signal generation section 12, and a control section 13.

Figure 1:
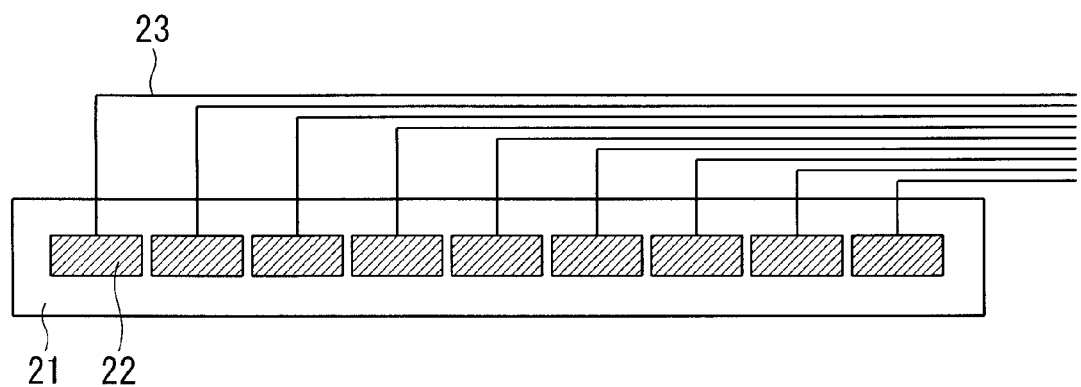
FIG. 1 shows a construction of a sensor body according to an embodiment of the present invention.

The sensor body 11 is provided with, for example, a plurality of electrodes 22, ..., 22 formed on a piezoelectric film 21, and signal wires 23 connected to each of the electrodes 22. As shown in FIG. 1, the sensor body 11 is arranged in the vicinity of the outer surface of the vehicle (on an inner surface of a front bumper face in front of the vehicle, or the like).

The piezoelectric film 21 is obtained by forming a polymer piezoelectric substance such as polarized polyvinylidene fluoride in a film shape. Each of the electrodes 22, ..., 22 which detects electric charges as voltage is formed of an electrically conductive thin plate, metal paste or vapor-deposited metal.

Figure 2:
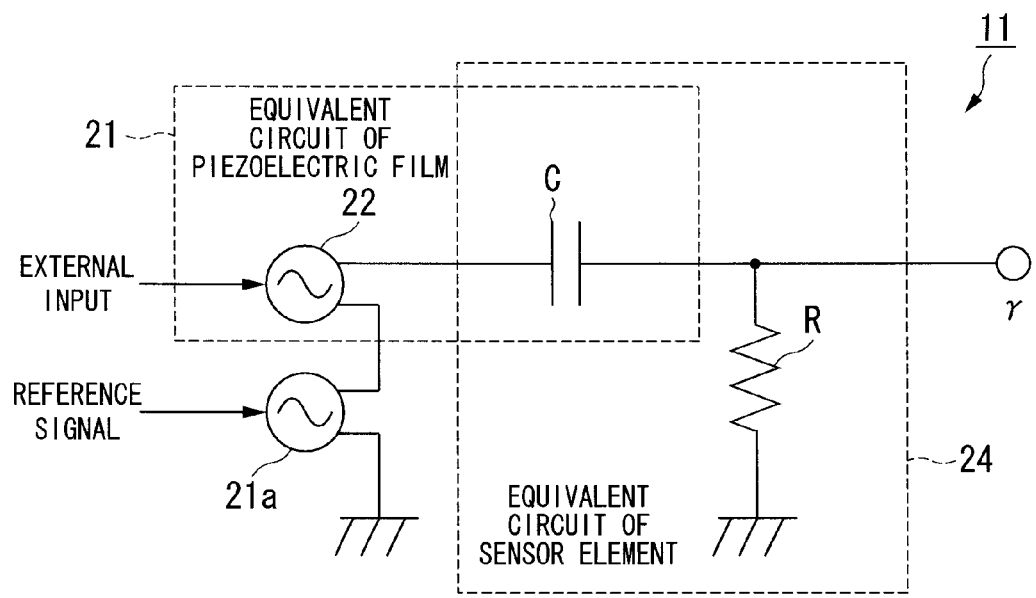
FIG. 2 shows a block diagram of the sensor body.

The piezoelectric film 21 is grounded, as shown in FIG. 2, for example, through a reference signal input terminal 21a to which a predetermined reference signal from the reference signal generation section 12 is input. Therefore, a synthesized signal $\gamma$ is output from a plurality of the electrodes 22, ..., 22 formed on the piezoelectric film 21, where the synthesized signal $\gamma$ includes a strain rate measurement signal $\alpha$ which is in response to external input (e.g. less than several hundreds Hz) due to an external force or the like to deform the piezoelectric film 21, and a reference signal $\beta$ (e.g. greater or equal to several kHz).

Note that the sensor body 11 is provided with a differential circuit equivalent to a differential circuit 24 shown in FIG. 2, for example, in which the differential circuit 24 has a capacitor C of the piezoelectric film 21 and a predetermined resistor R (e.g. 100 k$\Omega$) which is grounded. A temporal differentiation value of Voltage V caused at each of the electrodes 22 (dV/dt) is output from the differential circuit 24 as the synthesized signal $\gamma$.

The reference signal generation section 12 generates the reference signal $\beta$ of which the frequency (e.g. greater or equal to several kHz) is higher than that of the maximum frequency of voltage signal (e.g. less than several hundred Hz) intended to be measured at the sensor body 11, and inputs the reference signal $\beta$ to the reference signal input terminal 21a of the piezoelectric film 21.

Figure 3:
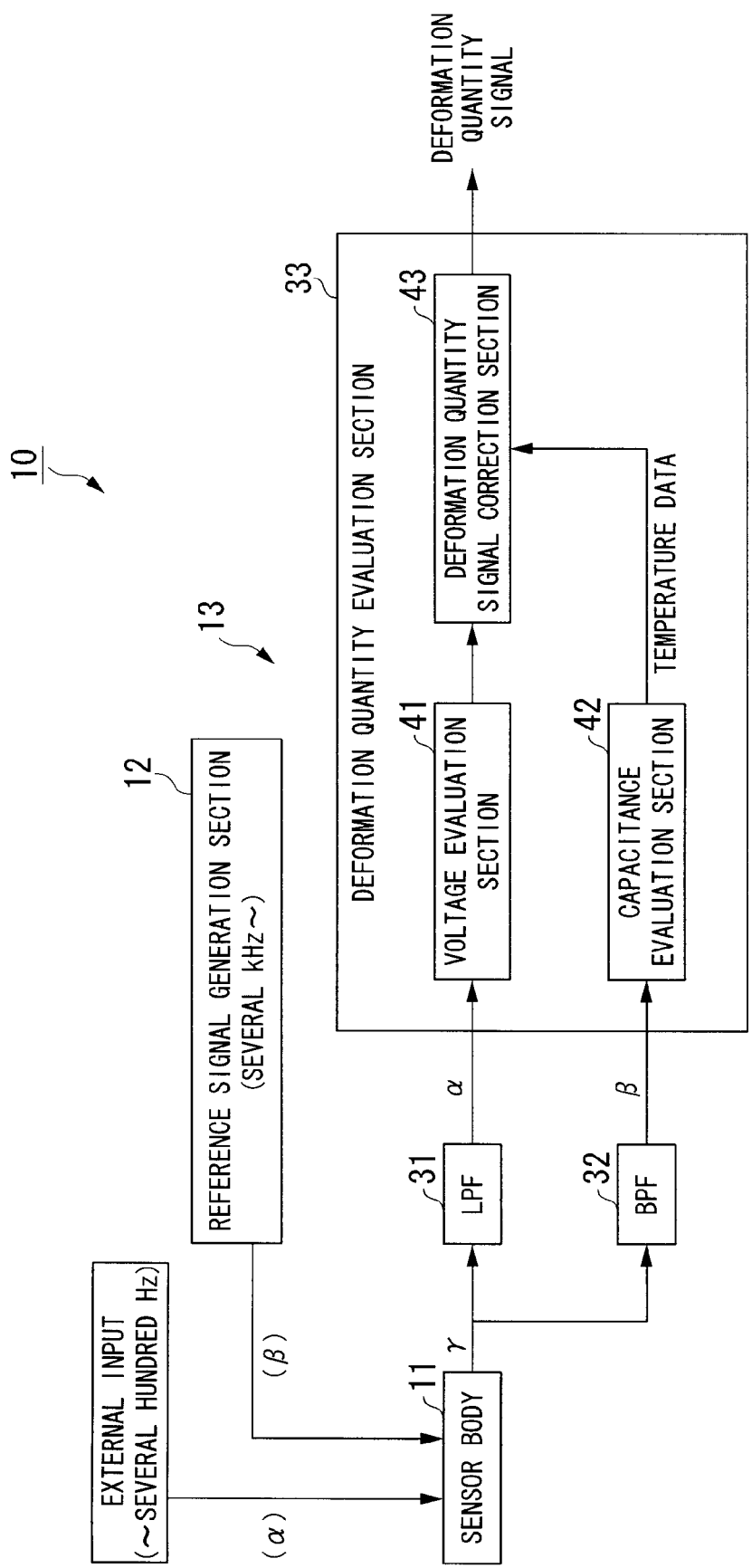
FIG. 3 shows a block diagram of a deformation detection sensor according to the embodiment.

As shown in FIG. 3, the control section 13 includes, for example, a low pass filter (LPF) 31, a band pass filter (BPF) 32 and a deformation quantity evaluation section 33. The low pass filter (LPF) 31 passes a predetermined low-frequency component (e.g. less than several hundreds Hz) corresponding to the strain rate measurement signal $\alpha$ among the synthesized signal $\gamma$ output from the sensor body 11. The band pass filter (BPF) 32 passes a predetermined frequency component (e.g. greater or equal to several kHz) corresponding to the reference signal $\beta$ among the synthesized signal $\gamma$. The deformation quantity evaluation section 33 is provided with, for example, a voltage evaluation section 41, a capacitance evaluation section 42 and a deformation quantity signal correction section 43.

Figure 4:
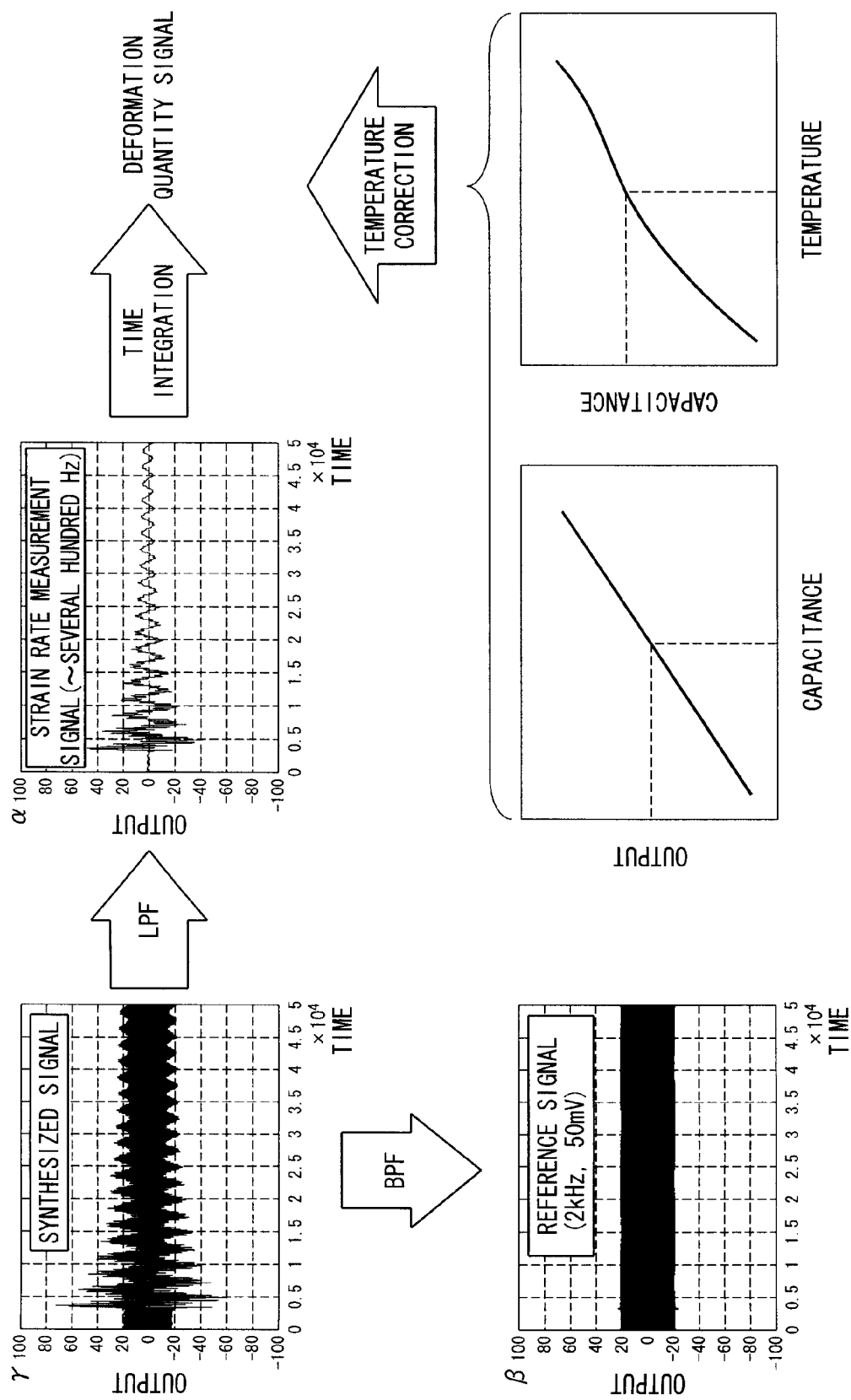
FIG. 4 shows a schematic diagram indicating a sequential process to generate a deformation quantity signal using a synthesized signal output from the sensor body.

The voltage evaluation section 41 of the deformation quantity evaluation section 33 generates the deformation quantity signal by performing time integration of the strain rate measurement signal $\alpha$ output from the low pass filter (LPF) 31 as shown in FIG. 4, for example, and outputs the deformation quantity signal to the deformation quantity signal correction section 43.

The capacitance evaluation section 42 measures the power of the reference signal $\beta$ output from the band pass filter (BPF) 32, and obtains a capacitance by, for example, retrieving the value from a predetermined capacitance map based on the measured value. Note that the predetermined capacitance map shows the power change of the reference signal $\beta$ in response to changes in the capacitance of the piezoelectric film 21. In the capacitance map, for example, it is shown that the power of the reference signal $\beta$ increases as the capacitance increases.

Furthermore, the capacitance evaluation section 42 obtains a temperature by, for example, retrieving the value from a predetermined temperature map based on the value retrieved from the capacitance map. Note that the predetermined temperature map shows the capacitance change in response to changes in the temperature of the piezoelectric film 21. In the temperature map, for example, it is shown that the capacitance increases as the temperature increases.

Subsequently, the capacitance evaluation section 42 outputs the retrieved value of the temperature obtained from the temperature map, as a temperature of the piezoelectric film 21, to the deformation quantity signal correction section 43.

The deformation quantity signal correction section 43 corrects the deformation quantity signal input from the deformation quantity evaluation section 33 in accordance with the temperature input from the capacitance evaluation section 42 so as to cancel out power fluctuation due to the temperature change of the piezoelectric film 21, and outputs the corrected deformation quantity signal.

Figure 5A:
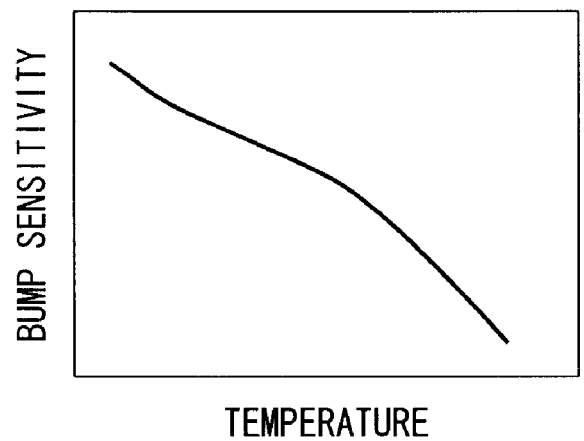

More specifically, as shown in FIG. 5A, for example, the bump sensitivity of the piezoelectric film 21 is varied in accordance with its temperature when the deformation detection sensor 10 is mounted on a vehicle as a bump detection sensor, since the piezoelectric film 21 is fluctuated in electrical property (e.g. capacitance) in accordance with its temperature change.

Figure 5B:
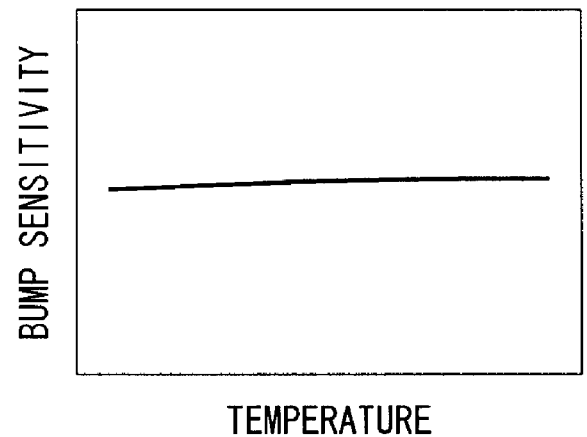
FIG. 5B shows a graph indicating an example of bump sensitivity variation with temperature.

On the other hand, by conducting the reference signal $\beta$ to the piezoelectric film 21 in which the reference signal $\beta$ does not interfere with the strain rate measurement signal $\alpha$ output from the piezoelectric film 21, measuring the capacitance change and temperature of the piezoelectric film 21 based on the power fluctuation of the reference signal $\beta$ in response to the temperature change of the piezoelectric film 21, and canceling out power fluctuation of the piezoelectric film in accordance with the temperature, as shown in FIG. 5B, for example, it is possible to inhibit the change of the bump sensitivity of the piezoelectric film in response to the temperature fluctuation; thereby improving the detection accuracy and the reliability of the bump state.

As has been described above, according to the deformation detection sensor 10 of the present embodiment, it is possible to obtain the information on the temperature of the piezoelectric film 21 as well as the deformation of the piezoelectric film 21 by inputting the reference signal $\beta$ to the piezoelectric film 21, and measuring the strain rate measurement signal $\alpha$ due to the deformation and the reference signal $\beta$ out of the output signal (i.e., synthesized signal $\gamma$) of the piezoelectric film 21 separately to each other. In addition, the information on the deformation of the piezoelectric film based on the strain rate measurement signal $\alpha$ can be corrected in response to the temperature of the piezoelectric film 21 based on the reference signal $\beta$. Furthermore, it is possible to improve the detection accuracy and the reliability of the information on the deformation of the piezoelectric film 21.

Note that the capacitance evaluation section 42 measures the capacitance of the piezoelectric film 42 based on the power of the reference signal β output from the band pass filter (BPF) 32 in the above-described embodiment, but it may be arranged so as to measure a dielectric constant of the piezoelectric film 42 instead of the capacitance. In this case, the capacitance evaluation section 42 is provided with a dielectric constant map which shows the power change of the reference signal β in response to dielectric constant change of the piezoelectric film 21 and a temperature map which shows the dielectric constant change in response to the temperature change of the piezoelectric film 21. Consequently, the temperature of the piezoelectric film 21 is obtained by retrieving the temperature map based on a value of the dielectric constant retrieved from the dielectric constant map.

Also note that a detection filter may be adopted instead of the band pass filter 32 in the above-described embodiment.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A deformation detection sensor, comprising:
   a piezoelectric element which generates an output signal due to a deformation;
   a reference signal input device which inputs a reference signal of a predetermined cycle to the piezoelectric element;
   a first signal extraction device which extracts a first output signal due to the deformation of the piezoelectric element out of the output signal from the piezoelectric element;
   a second signal extraction device which extracts a second output signal due to the reference signal out of the output signal from the piezoelectric element;
   a first evaluation device which evaluates the voltage of the first output signal extracted by the first signal extraction device; and
   a second evaluation device which evaluates the second output signal extracted by the second signal extraction device, by evaluating a capacitance or a dielectric constant of the piezoelectric element.

2. The deformation detection sensor according to claim 1, further comprising a correction device which corrects an evaluation result obtained by the first evaluation device based on an evaluation result obtained by the second evaluation device.

3. The deformation detection sensor according to claim 1, wherein:
   the reference signal is higher than the first output signal in frequency;
   the first signal extraction device includes a low pass filter;
   the second signal extraction device includes a band pass filter or a detection filter; and
   a passband used in the first signal extraction device and a passband used in the second signal extraction device are separate to each other.

4. The deformation detection sensor according to claim 1, wherein the second evaluation device evaluates a temperature of the piezoelectric element.

5. The deformation detection sensor according to claim 4, further comprising a deformation quantity evaluation device which evaluates a deformation quantity of the piezoelectric element, based on the temperature of the piezoelectric element obtained by the second evaluation device and the deformation of the piezoelectric element obtained by the first evaluation device.

* * * * *